United States Patent [19]
Nevoux et al.

[11] Patent Number: 5,661,806
[45] Date of Patent: Aug. 26, 1997

[54] PROCESS OF COMBINED AUTHENTICATION OF A TELECOMMUNICATION TERMINAL AND OF A USER MODULE

[75] Inventors: Rola Nevoux, Elancourt; Mireille Campana, Clamart, both of France

[73] Assignee: France Telecom, Paris, France

[21] Appl. No.: 411,206

[22] Filed: Mar. 27, 1995

[30] Foreign Application Priority Data

Mar. 29, 1994 [FR] France .................... 94 03685

[51] Int. Cl.$^6$ .................... H04L 9/00
[52] U.S. Cl. .................... 380/25; 380/4; 380/21
[58] Field of Search .................... 380/4, 23, 25, 380/21

[56] References Cited

U.S. PATENT DOCUMENTS 5,371,794  12/1994  Diffie et al. .................... 380/21
5,539,824   7/1996  Bjorklund et al. .................... 380/21

OTHER PUBLICATIONS

Telcom Report Siemens, vol. 16, No. 6, Nov. 1993, Munchen (DE) "Safety First Bei Europaweiter Mobilkommunikation" J. Beheim pp. 326–329.

L'Echo Des Recherches, No. 139, 1990, Issy Les Moulineaux (FR) "Une Application De La Carte A Microprocesseur: Le Module D'Identite D'Abonne Du Radiotelephone Numerique Europeen" P. Jolie & G. Mazziotto—pp. 13–20.

Primary Examiner—David C. Cain
Attorney, Agent, or Firm—Larson & Taylor

[57] ABSTRACT

The terminal and the user module are authenticated in a combined manner on the basis of an authentication key calculated on the one hand by the terminal and on the other hand by the network. A session key is firstly calculated by the user module on the basis of a secret user key, of a terminal identification parameter and of a first random number. Calculation of the authentication key by the terminal involves this session key calculated by the user module, a secret terminal identification key and a second random number. The network calculates in the same way the session key and the authentication key by retrieving the secret keys on the basis of the identification parameters transmitted by the terminal. The terminals can then be authenticated by the network independently of the associated user modules.

6 Claims, 3 Drawing Sheets

PROCESS OF COMBINED AUTHENTICATION OF A TELECOMMUNICATION TERMINAL AND OF A USER MODULE

BACKGROUND OF THE INVENTION

The present invention relates to a process for controlling access to a telecommunications network by means of a terminal operating together with a user module. It finds an application in any communication system requiring authentication of the terminals.

Procedures are known, for example from EP-A-0 552 392, which make it possible mutually to authenticate a user module and a terminal. These procedures enable the user to be assured of the authenticity of the terminal to which he presents his module. On the other hand, they do not advise the network regarding the authenticity of the terminal or of the module.

The communication network needs to ascertain and verify the identity of the users in order to ensure proper routing of the communications and to allow billing. Most often, as for example in the case of the European cellular radio telephone (GSM), each terminal is associated with a single user, and authentication of the terminals and of the users is merged.

Currently, the concept of personal mobility is developing, and there is a desire to enable the terminals to be shared by several users. This entails separation between the management of the users and that of the terminals.

Under the layout currently applied to the current GSM network, authentication pertains solely to the user modules. The terminal contains no specific security data. Withdrawal of the user module entails the absence of the authentication data related to the terminal. The latter then becomes dormant and is no longer contactable. When it is moved, especially during a location update procedure, it is the user module (SIM) which is authenticated (see the article "Une application de la carte à microprocesseur: le module d'identité d'abonné du radiotéléphone numérique européen" (An application of the microprocessor card: the subscriber identity module of the European digital radio telephone) by P. Jolie et al., published in l'Echo des Recherches No. 139, 1st quarter 1990, pages 13 to 20). Moreover, if the terminal is envisaged as being shareable by several users for receiving communications, it becomes possible for several users to be logged onto the same terminal during a location update. It can happen that the terminal does not physically possess a user module during a location update; in this case, authentication is impossible and the location update fails, seeing that it must be impossible for the terminals to use radio resources without being associated with users.

In view of the foregoing, a main object of the present invention is to provide a flexible procedure for the combined authentication of a user module and of a terminal.

SUMMARY OF THE INVENTION

The invention proposes a process for controlling access to a telecommunications network by means of a terminal operating together with a user module, in which a session key is calculated, on the one hand by the user module and on the other hand by the network, on the basis of data which include a user identification key held secretly in a memory of the user module and a first random number provided by the network, the network retrieving the user identification key on the basis of a user identification parameter issued by the terminal. The terminal calculates an authentication key on the basis of data which include the session key calculated by the user module, a terminal identification key held secretly in a memory of the terminal and a second random number provided by the network. The network calculates in the same way the authentication key on the basis of data which include the session key calculated by the network, the terminal identification key retrieved by the network on the basis of a terminal identification parameter issued by the terminal and the second random number. The terminal is authorized to access the network in the event of concordance between the authentication keys calculated by the terminal and by the network.

The session key serves to control the user modules, whereas the authentication key serves to control the user modules (via the session key) and the terminals in a combined manner. This mode of access control offers great flexibility. In particular, the terminals and the users can be managed by different entities. Thus, when the network comprises an access system and one or more user management units, the session key calculations are performed at user management unit level (under the control of the service provider), whereas the authentication key calculations are performed at access system level (under the control of the network operator).

Preferably, the terminal stores the user identification parameter and the session key calculated by the user module, and the network stores the user identification parameter and the terminal identification parameter which are received from the terminal as well as the session key calculated by the network. In this way, physical association of the user module with the terminal is no longer indispensable when a subsequent authentication procedure is performed, since it is no longer necessary to recalculate a session key each time. This advantage is particularly important in cellular radio telephone networks, for which authentication procedures are in general performed during each location update of a mobile station.

With the process according to the invention, it is possible to envisage "signing on" several users to the same terminal. Access to the network by the terminal can be authorized for each of the user modules presented in succession to the terminal, without throwing off the previous users. There is thus provision for the terminal to store the user identification parameters relating to each of the modules which were presented in succession to it, and at least one session key calculated for one of these modules, and provision for the network to store the user identification parameters relating to each of these modules, the terminal identification parameter and at least the session key calculated by the network in relation to said one of these modules.

DESCRIPTION OF PREFERRED EMBODIMENTS

Figure 1:
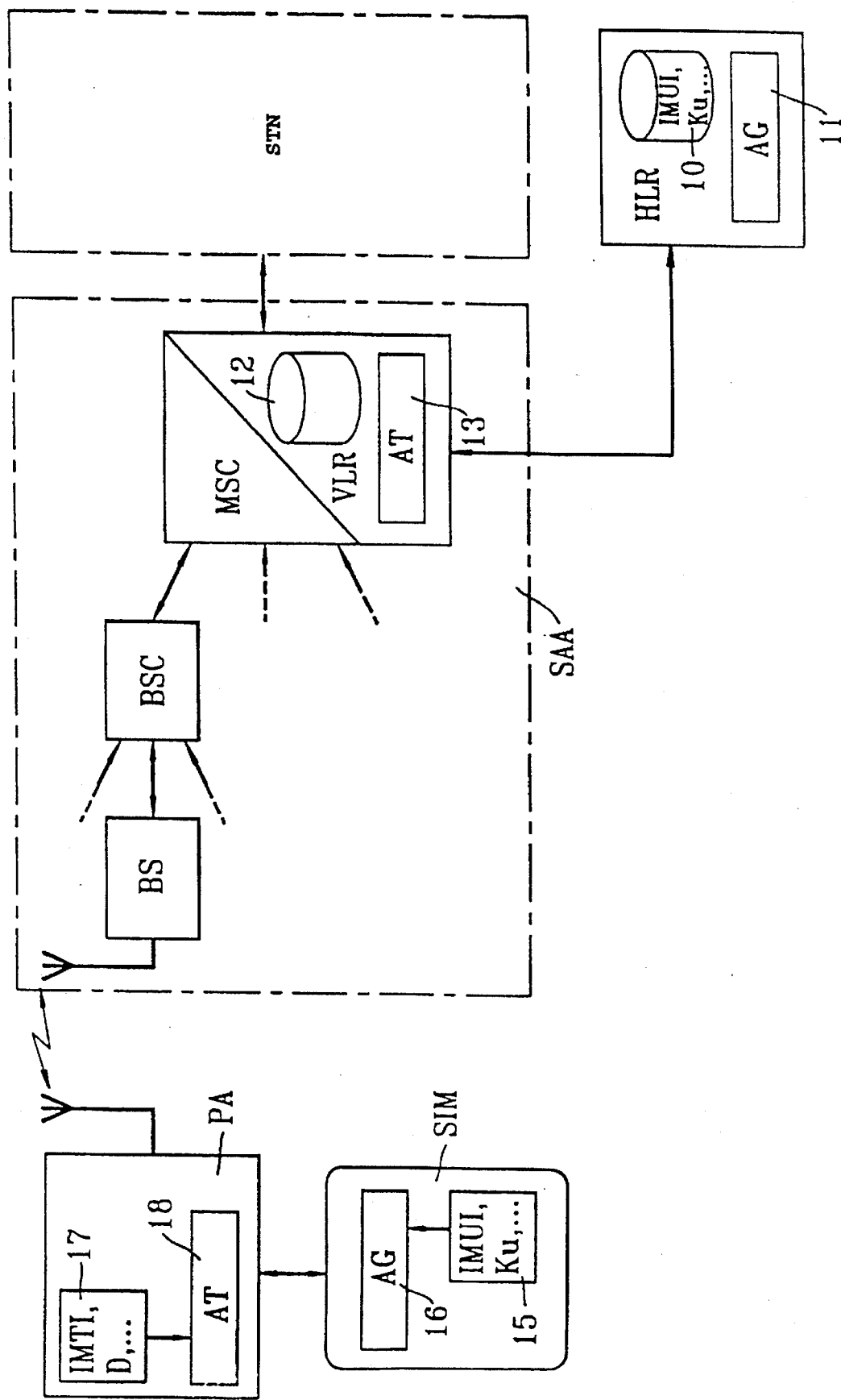
FIG. 1 is a schematic layout of a cellular radio telephony network and of an associated mobile station, for the implementation of the invention.

The invention is described below in its application to a cellular radio telephony network. A person skilled in the art will understand that the process is readily generalizable to other types of telecommunications network. FIG. 1 illustrates the well-known architecture of the European radio telephone network GSM. For a general description of this network reference may be made to the article "Le systéme cellulaire numérique europeen de communication avec les mobiles" (The European digital cellular system for communication with mobiles) by B. Ghillebaert et al., published in l'Echo des Recherches No. 131, first quarter 1988, pages 5 to 16.

The cellular network comprises an access system SAA, and one or more user management units HLR. The access system SAA is connected to a wire telephone network STN to enable mobile users to communicate with subcribers to the wire network. The access system SAA includes a number of base stations BS scattered around the region covered, which provide for the radio interface with the mobile stations. Each base station BS is operated by a base station controller BSC connected to a mobile service switching centre MSC.

For management of users, the management unit, or home location register HLR includes a database 10 in which are stored the information required for management of the communications by a number of mobile subscribers. The database 10 is associated with processing circuits 11 which carry out calculations and data exchanges serving in the management of the communications. The access system SAA further comprises visitor location registers VLR each associated with one or more switching centres MSC. A VLR comprises a database 12 containing a copy of the records of the HLRs for all the mobile subscribers who are found within the cells dependent on the switching centre(s) MSC in question, and associated processing circuits 13.

A mobile station able to communicate with the cellular network comprises a terminal PA associated with a user module SIM. The module SIM takes either the form of a memory card, or the form of a plug-in component in which are stored various user-specific data, including his identification parameter IMUI and his secret user identification key Ku. The identification key Ku is stored in a protected area of the memory 15 of the module SIM. It is also stored in the database 10 of the HLR to which the user pertains, in correspondence with the identification parameter IMUI. The key Ku is never transmitted between two functional components involved in a communication for security reasons. Management of the parameters IMUI and secret keys Ku is therefore carried out by the operator of the network who has responsibility for the HLR and who delivers the user modules SIM. The memory 15 of the module SIM is associated with processing circuits 16 which perform calculations and carry out data exchanges with the terminal PA.

For the implementation of the process according to the invention, the terminal PA also includes a memory 17 in which are stored terminal-specific data, including the terminal identification parameter IMTI and the secret terminal identification key D. The memory 17 is associated with processing circuits 18 which perform certain calculations involved in the authentication procedure, and which carry out data exchanges on the one hand with the module SIM and on the other hand with the access system SAA. Provision may be made for the secret keys D to be related to the corresponding identification parameters IMTI through a secret function known only to the operator of the network, which writes the key D=f (IMTI) into a protected area of the memory 17 of each terminal. The network (VLR) is then capable of retrieving the key D relating to a terminal on the basis of its identification parameter IMTI. When such a secret function f is called upon, the network has no need to employ a nominal database of all the available terminals nor to determine the network of origin of each terminal.

The mode of communication between the components of a mobile station and of the cellular network is conventional and will not be detailed further here. It will be possible in this respect to refer to the article by B. GHILLEBAERT et al. cited earlier. Only the access control process of relevance to the present invention will be described below, with reference to FIGS. 2 and 3.

The access control process employs two distinct cryptographic functions AG and AT. The first function AG is applied at the level of the modules SIM and of the management units HLR in order to calculate session keys Ks. The algorithm of the function AG is therefore stored both in the modules SIM (in a protected area of the memory 15) and in the HLRs. The function AG is not necessarily identical for all the service providers managing HLRs. In the embodiment described, the function AG has three arguments: (i) the secret identification key Ku of the relevant user, (ii) the identification parameter IMTI of the relevant terminal, and (iii) a random number R1 provided by the network. The function AG can of course include other arguments (for example the identification parameter IMUI of the relevant user), if it is desired to obtain greater diversity within the session keys Ks.

A second cryptographic function AT is applied in order to calculate authentication keys SRES on the one hand at the level of the terminals PA, and on the other hand at the level of the access system SAA, or specifically at the level of the relevant visitor location register VLR. The algorithm of the function AT is therefore stored both in the terminals (in a protected area of the memory 17) and in the VLRs. In the embodiment described, the function AT has three arguments: (i) the session key Ks calculated by means of the first function AG, (ii) the secret identification key D of the relevant terminal, and (iii) a second random number R2 provided by the network. Of course, the function AT may include other arguments (for example the identification parameter IMTI of the relevant terminal), if it is desired to obtain greater diversity within the authentication keys SRES.

Figure 2:
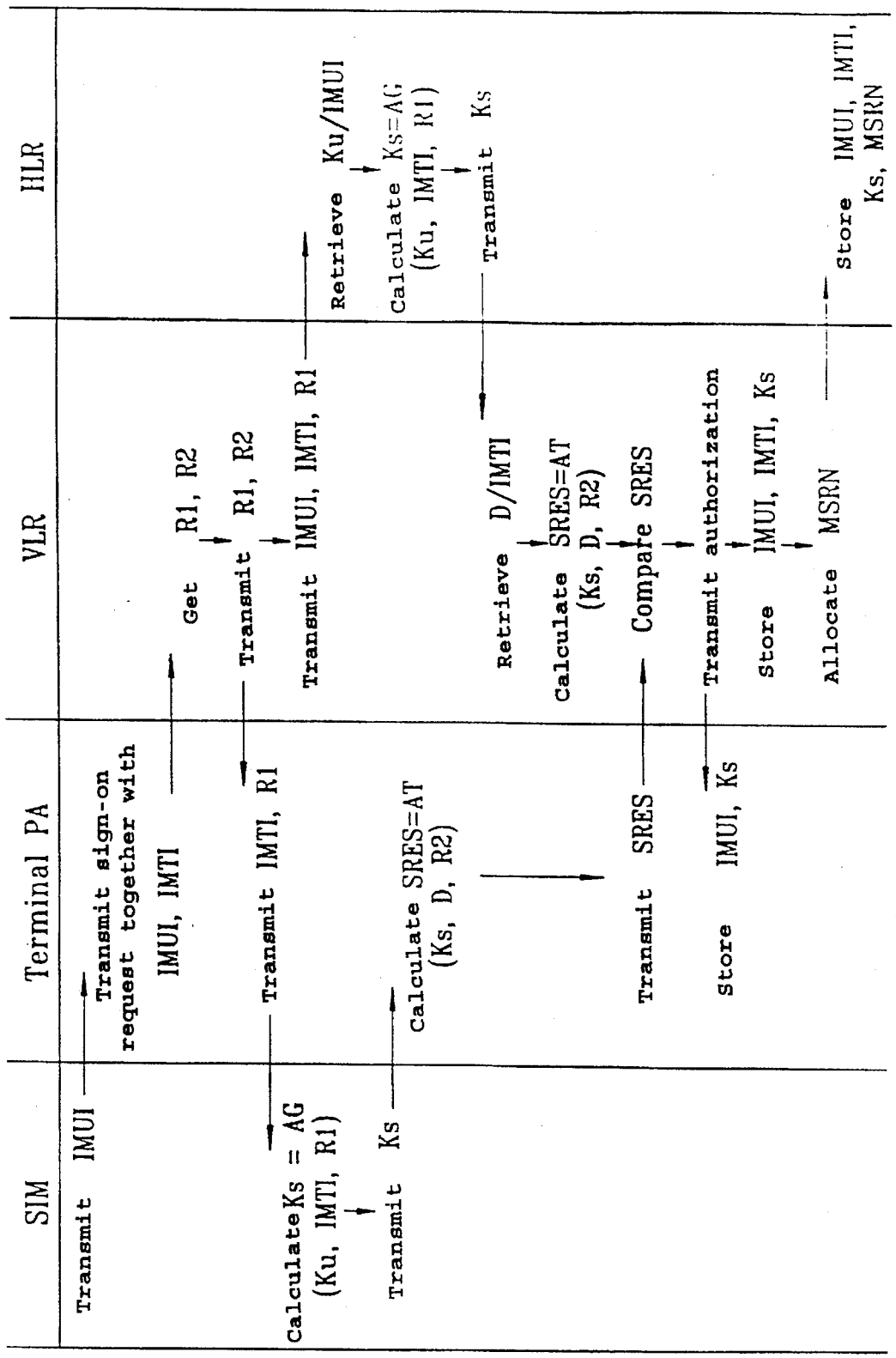
FIGS. 2 and 3 are charts illustrating the steps of authentication procedures performed in accordance with the process according to the invention.

A procedure for signing-on and authorizing a user at a terminal PA is illustrated in FIG. 2. When the user presents his module SIM to the terminal (or when powering up the terminal physically associated with the module SIM), the module SIM transmits the user identification parameter IMUI stored in its memory 15 to the terminal PA. The terminal then issues a sign-on request which includes the parameter IMUI which it has just received from the module SIM and its own identification parameter IMTI stored in its memory 17. The access system SAA routes the sign-on request to the relevant VLR. The VLR then generates two random numbers R1, R2 and transmits them to the terminal PA through the access system. The VLR also informs the relevant HLR of the sign-on request and transmits to it the identification parameters IMUI, IMTI together with the first random number R1.

The terminal PA then communicates its identification parameter IMTI and the first random number R1 to the module SIM. The module SIM calculates the session key Ks=AG (Ku, IMTI, R1) and transmits it to the terminal PA. The terminal calculates the authentication key SRES on the basis of the session key Ks which it has just received from the module SIM, of its secret identification key D, and of the second random number R2: SRES=AT (Ks, D, R2). This authentication key SRES is sent by the terminal to the VLR through the access system.

On the basis of the user identification parameter IMUI which it has received from the VLR, the HLR retrieves from its database 10 the secret key Ku associated with this parameter IMUI. It then calculates the secret key Ks=AG (Ku, IMTI, R1) and transmits it to the VLR. On the basis of the terminal identification parameter IMTI which it has received from the terminal PA, the VLR retrieves the associated secret key D=f (IMTI). It then calculates the authentication key SRES on the basis of the session key Ks which it has received from the HLR, of the terminal identification key D which it has retrieved, and of the second random number R2: SRES=AT (Ks, D, R2). The VLR next compares the authentication key SRES which it has calculated itself with that which it has received from the terminal PA, so as to determine whether the terminal should be authorized to access the network. In the event of concordance between the authentication keys, authorization is given to the terminal PA which then stores the user identification parameter IMUI and the session key Ks which it has received from the module SIM. On its side, the VLR stores the identification parameters IMUI and IMTI, as well as the session key Ks which it has received from the HLR, then it allocates the IMUI/IMTI session a roaming number MSRN which it communicates to the HLR. The HLR can then store the data relating to the user identified by the parameter IMUI, namely the terminal identification parameter IMTI, the session key Ks calculated by the HLR, and the roaming number MSRN allocated by the VLR.

Authentication therefore pertains both to the user module (through the session key Ks) and to the terminal.

Once the sign-on and authentication procedure illustrated in FIG. 2 has terminated, the user can withdraw his module SIM whilst remaining signed-on to the terminal PA. In the event of an outside call intended for this user, the HLR is interrogated and retrieves the relevant VLR on the basis of the roaming number MSRN associated with this user IMUI. The VLR can then determine the base station BS with which the terminal PA to which the user is signed-on can communicate. Communication can be established without a new session key Ks being calculated, that is to say without the user needing to reinsert his module SIM. In the event of a call emanating from the mobile user, there is provision preferably for the latter to have to reinsert his module SIM and for the sign-on and authorization procedure illustrated in FIG. 2 to be repeated.

After sign-on and authorization of the user IMUI and withdrawal of this users's module SIM, it is possible to sign on another user IMUI' to the same terminal. The procedure applied is essentially the same as that illustrated in FIG. 2. A new session key Ks' and a new authentication key SRES' are calculated, and authentication is performed on the basis of the authentication key SRES'. When authorization is effectual, the terminal PA stores the two user identification parameters IMUI, IMUI' and the session key Ks', and the VLR stores the two user identification parameters IMUI, IMUI', the terminal. identification parameter IMTI, and the session key Ks'. The new session key Ks' is therefore shared between the various users IMUI, IMUI' signed on to the terminal PA. It is also possible to retain the two session keys Ks and Ks' in memory, each user IMUI, IMUI' then retaining his own session key. The procedure below is applicable in the same way to the signing-on of any number of users to the same terminal.

Figure 3:
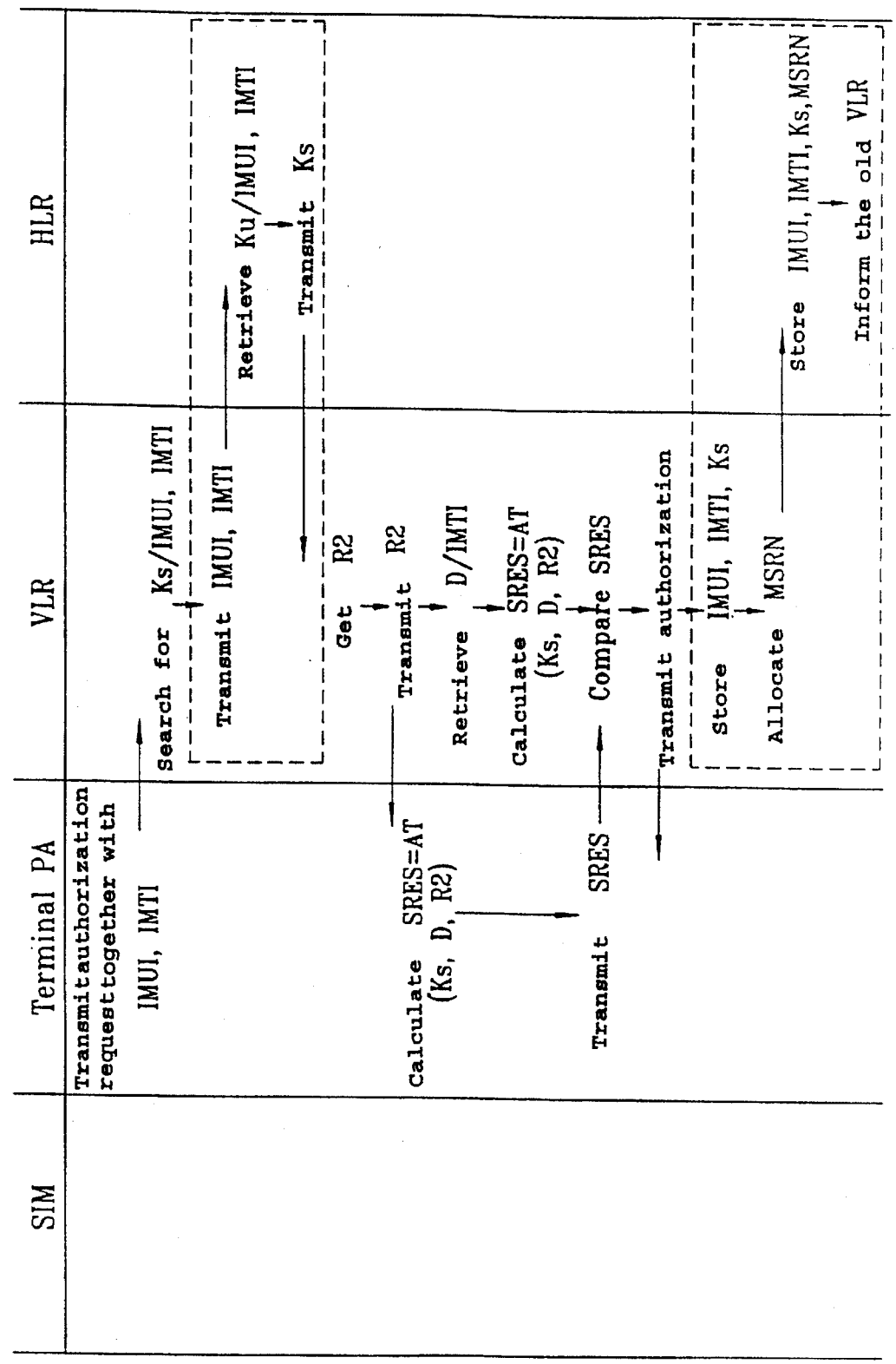

The subsequent authentication procedure applicable at the behest of the network or during a terminal location update is illustrated in FIG. 3. When the terminal PA has determined that it must change area of location, it transmits to the relevant VLR an authorization request which includes the identification parameter of the signed-on user IMUI, and the identification parameter of the terminal IMTI. The VLR then searches its database 12 for whether it has stored a session key Ks in connection with the parameters IMUI and IMTI.

If the VLR finds no session key in connection with IMUI and IMTI, then it is the case of a location update together with change of relevant VLR. On the basis of the user identification parameter IMUI, the VLR is enabled to determine the HLR managing the user's communications. It transmits the parameters IMUI and IMTI to this HLR. The relevant HLR then retrieves from its database 10 the session key Ks associated with the user IMUI and with the terminal IMTI, and transmits this session key Ks to the VLR. The VLR then generates a random number R2 which it transmits to the terminal PA through the access system. The terminal PA calculates an authentication key SRES on the basis of the session key Ks which it has previously stored, of its secret identification key D and of the random number R2 which it has just received from the VLR: SRES=AT (Ks, D, R2). This authentication key SRES is transmitted by the terminal PA to the VLR. On its side, the VLR retrieves the secret terminal identification key D on the basis of the parameter IMTI which it has received. It then calculates the authentication key SRES on the basis of the session key Ks which it has received from the HLR, of the key D which it has just retrieved, and of the random number R2: SKES=AT (Ks, D, R2). The VLR compares the authentication key SRES which it has just calculated with that which it has received from the terminal PA and, in the event of concordance, it gives authorization to the terminal PA to communicate. When authorization is effectual, the VLR stores the identification parameters IMUI, IMTI, and the session key Ks which it has received from the HLR, then it allocates a new roaming number MSRN to the user. This roaming number is transmitted to the HLR which stores it in connection with the identification parameters IMUI, IMTI and the session key Ks. The HLR lastly informs the old VLR, to which the user was previously signed on, that it can delete its records relating to the user IMUI and to the terminal IMTI.

If the VLR initially finds a session key Ks associated with the identification parameter IMUI, IMTI, then it is the case of a location update without change of VLR. The authentication procedure applied is then the same as that illustrated in FIG. 3, except that the steps represented surrounded by broken lines need not be performed. In this case, no exchange of data between the VLR and the HLR is necessary.

The subsequent authentication procedures illustrated in FIG. 3 are applicable in similar fashion when several users IMUI, IMUI', ... are simultaneously signed on to the same terminal PA.

After signing on one or more users, the terminal can hence be authenticated autonomously, independently of the associated module(s) SIM (the module SIM does not come into the chart of FIG. 3). This advantage is particularly important in radiocommunication networks requiring to authenticate the terminals during location updates.

It will be observed that the process described above by way of example can be contrived so as to take account of the constraints specific to each type of network. For example, there may be provision for the user and terminal identification parameters IMUI, IMTI, which do not have the same degree of confidentiality as the secret keys Ku, D, not to be transmitted plainly over the radio interface between the base stations and the mobile stations, this interface being accessible to everyone. In particular, the identification parameters can be transmitted in a coded form dependent on the area of location of the mobile station. A well-known example of such a mode of coding is applied in the case of the GSM in order to define the temporary mobile subscriber identities (TMSI) of the users (see GSM Recommendations No. 02.09, 02.17, 03.20 and 03.21).

There may furthermore be provision for the random numbers R1 involved in calculating the session keys to be generated by the HLRs and not by the VLRs. In particular, when the VLR transmits a sign-on request to the HLR together with the parameters IMUI and IMTI (FIG. 2), the HLR can generate several random numbers $R1_1, \ldots R1_n$ and calculate the corresponding session keys $Ks_1, \ldots Ks_n$. It then transmits several pairs $(R1_i, Ks_i)$ to the VLR which selects one of them in order to calculate the authentication key SRES. When the sign-on and authorization procedure is subsequently repeated, (at the behest of the network, or in the event of a call emanating from the mobile station), the VLR can use another pair $(R1_j, Ks_j)$ without having to turn to the HLR again. This arrangement, applied in comparable manner in the current GSM system, advantageously reduces the number of exchanges between the VLR and the HLR.

We claim:

1. Process for controlling access to a telecommunications network by means of a terminal operating together with a user module, in which a session key is calculated, on the one hand by the user module and on the other hand by the network, on the basis of data which include a user identification key held secretly in a memory of the user module and a first random number provided by the network, the network retrieving the user identification key on the basis of a user identification parameter issued by the terminal, wherein the terminal calculates an authentication key on the basis of data which include the session key calculated by the user module, a terminal identification key held secretly in a memory of the terminal and a second random number provided by the network, wherein the network calculates in the same way the authentication key on the basis of data which include the session key calculated by the network, the terminal identification key retrieved by the network on the basis of a terminal identification parameter issued by the terminal and the second random number, and wherein the terminal is authorized to access the network in the event of concordance between the authentication keys calculated by the terminal and by the network.

2. Process according to claim 1, wherein the network including an access system and at least one user management unit, the calculations of session keys by the network are performed at user management unit level, whereas the calculations of authentication keys by the network are performed at access system level.

3. Process according to claim 1, wherein the data on the basis of which the session key is calculated further include the terminal identification parameter.

4. Process according to claim 1, wherein the terminal stores the user identification parameter and the session key calculated by the user module, and wherein the network stores the user identification parameter and the terminal identification parameter which are received from the terminal as well as the session key calculated by the network.

5. Process according to claim 1, wherein, when a plurality of user modules have been presented in succession to the terminal, and when access to the network by the terminal has been authorized for each of said plurality of user modules, the terminal stores the user identification parameters relating to each of said plurality of modules and at least one session key calculated by one of said plurality of modules, and the network stores the user identification parameters relating to each of said plurality of modules, the terminal identification parameter and at least the session key calculated by the network in relation to said one of said plurality of modules.

6. Process according to claim 4, further comprising a subsequent authentication procedure which includes the following steps:

the terminal sends the network its identification parameter and the user identification parameter or parameters which it stores;

the network sends the terminal a random number;

the terminal calculates an authentication key on the basis of data which include the session key which it has held in memory, its identification key and the random number which it has just received from the network; and the terminal sends said authentication key to the network;

the network calculates in the same way the authentication key on the basis of data which include the session key which it has held in memory in connection with the identification parameters received from the terminal, the terminal identification key retrieved on the basis of the terminal identification parameter and the random number; and the network compares the authentication key which it has received from the terminal with that which it has calculated in order to authorize the terminal to access the network in the event of concordance.

* * * * *